United States Patent
Wu (10) Patent No.: US 9,989,639 B2
(45) Date of Patent: *Jun. 5, 2018

(54) WIRELESS WATER REGIMEN DETECTING DEVICE, SYSTEM AND METHOD BASED ON WIFI

(71) Applicant: Vexilar, Inc., Bloomington, MN (US)

(72) Inventor: Xiujun Wu, Guangdong (CN)

(73) Assignee: Vexilar, Inc., Bloomington, MN (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/467,709

(22) Filed: Mar. 23, 2017

(65) Prior Publication Data

US 2017/0199275 A1    Jul. 13, 2017

Related U.S. Application Data (63) Continuation of application No. 13/980,576, filed as application No. PCT/CN2013/070667 on Jan. 18, 2013, now Pat. No. 9,628,592.

(51) Int. Cl.
*H04B 11/00* (2006.01)
*G10K 11/00* (2006.01)
(Continued)

(52) U.S. Cl.
CPC ............ *G01S 15/96* (2013.01); *A01K 97/125* (2013.01); *A01M 31/002* (2013.01); *G01S 7/003* (2013.01);
(Continued)

(58) Field of Classification Search
CPC ................................. G01S 15/96; H04B 13/02
(Continued)

(56) References Cited

U.S. PATENT DOCUMENTS 807,875 A    12/1905  Shinners
2,490,669 A  12/1949  Burke
(Continued)

FOREIGN PATENT DOCUMENTS

EP    2889639 A4    4/2016
JP    2003-344530 A    12/2003
(Continued)

OTHER PUBLICATIONS

SmartCast™ Mode Operations Manual, Hummingbird, 12 pages, prior to May 12, 2014.
(Continued)

*Primary Examiner* — Simon Nguyen
(74) *Attorney, Agent, or Firm* — Patterson Thuente; Pedersen, P.A.

(57) ABSTRACT

A wireless water regimen detecting device includes a fish finder module, a data communication module connected to the fish finder module and a WIFI module connected to the data communication module, which are arranged within a housing. The wireless water regimen detecting device utilizes the wireless communication way of WIFI to make the display terminal of the fish finder module not be limited to the wireless receiving terminal which is especially prepared for it, but can use existing intelligent terminals with a WIFI wireless communication function, such as smart phone, tablet PC, notebook computer or other portable mobile devices, to display. Sweb operating mode of monopoly serial communication port can be utilized, thus the user can carry on related operation on the webpage of the display terminal by visiting the web server to obtain detecting information of the fish finder module. Much convenience is provided to the user.

26 Claims, 4 Drawing Sheets

(51) Int. Cl.
| | |
|---|---|
| *H04B 7/00* | (2006.01) |
| *G01S 15/96* | (2006.01) |
| *H04M 1/02* | (2006.01) |
| *H04W 4/00* | (2018.01) |
| *H04W 4/02* | (2018.01) |
| *G01S 7/00* | (2006.01) |
| *A01K 97/12* | (2006.01) |
| *A01M 31/00* | (2006.01) |
| *H04W 84/12* | (2009.01) |
| *H04L 29/12* | (2006.01) |

(52) U.S. Cl.
CPC ......... *H04M 1/0202* (2013.01); *H04W 4/003* (2013.01); *H04W 4/026* (2013.01); *H04W 4/60* (2018.02); *H04L 61/6068* (2013.01); *H04M 2250/10* (2013.01); *H04W 84/12* (2013.01)

(58) Field of Classification Search
USPC ....... 455/40–41.3, 556.1; 367/118, 120, 140, 367/188, 910, 131, 134, 141
See application file for complete search history.

(56) References Cited

U.S. PATENT DOCUMENTS

| | | | |
|---|---|---|---|
| 2,591,558 A | 4/1952 | Kramer | |
| 2,884,734 A | 5/1959 | Binkowski | |
| 5,297,109 A | 3/1994 | Barksdale, Jr. et al. | |
| 5,463,597 A | 10/1995 | Harlev | |
| 5,495,689 A | 3/1996 | Cassem | |
| 5,546,695 A | 8/1996 | Langer | |
| 5,887,376 A | 3/1999 | Currier et al. | |
| 6,122,852 A | 9/2000 | Mechling, IV | |
| D459,783 S | 7/2002 | Tseng | |
| 6,459,372 B1 | 10/2002 | Branham et al. | |
| 6,667,934 B1 | 12/2003 | Healey | |
| 6,690,622 B1 | 2/2004 | Eckberg, Sr. et al. | |
| 6,693,847 B2 | 2/2004 | Betts | |
| 6,771,562 B2 | 8/2004 | Betts et al. | |
| 6,791,902 B1 | 9/2004 | Steiner et al. | |
| D504,490 S | 4/2005 | Bedros | |
| 7,554,884 B2 | 6/2009 | Park | |
| 7,646,675 B1 | 1/2010 | McGonegal | |
| 8,154,953 B1 | 4/2012 | Sims et al. | |
| 8,433,463 B1* | 4/2013 | Lieberman | G06F 17/00 701/2 |
| D689,586 S | 9/2013 | Zuch et al. | |
| 9,137,977 B2* | 9/2015 | Davidson | A01K 85/01 |
| D742,480 S | 11/2015 | Zhang | |
| 9,628,592 B2* | 4/2017 | Wu | H04M 1/0202 |
| 2003/0056424 A1* | 3/2003 | Mueller | A01K 91/02 43/43.13 |
| 2003/0056592 A1 | 3/2003 | Tokuda et al. | |
| 2004/0105343 A1 | 6/2004 | Betts et al. | |
| 2005/0135192 A1 | 6/2005 | Fairbairn | |
| 2005/0218256 A1 | 10/2005 | Ikuta et al. | |
| 2006/0191185 A1* | 8/2006 | Hansen | A01K 91/08 43/27.4 |
| 2006/0216007 A1 | 9/2006 | Moreb | |
| 2007/0147173 A1* | 6/2007 | Park | G01S 7/521 367/107 |
| 2007/0159923 A1 | 7/2007 | Huff | |
| 2007/0203465 A1 | 8/2007 | Salvadori et al. | |
| 2007/0220798 A1 | 9/2007 | Davidson | |
| 2009/0135183 A1 | 5/2009 | Sato et al. | |
| 2009/0141027 A1 | 6/2009 | Sato et al. | |
| 2009/0220922 A1 | 9/2009 | Lee et al. | |
| 2009/0278005 A1 | 11/2009 | Bacarella et al. | |
| 2010/0000143 A1 | 1/2010 | Pekin | |
| 2010/0315654 A1 | 12/2010 | Berger | |
| 2011/0012773 A1 | 1/2011 | Cunning et al. | |
| 2012/0015566 A1 | 1/2012 | Salmon | |
| 2013/0016586 A1 | 1/2013 | Craig | |
| 2013/0159330 A1 | 6/2013 | Smith | |
| 2013/0215719 A1 | 8/2013 | Betts et al. | |
| 2013/0271301 A1* | 10/2013 | Kabel | B63B 49/00 340/987 |
| 2014/0010043 A1 | 1/2014 | Pawlik et al. | |
| 2014/0022864 A1* | 1/2014 | Lebedev | G01S 7/003 367/107 |
| 2014/0057677 A1 | 2/2014 | Liubinas et al. | |
| 2014/0066125 A1 | 3/2014 | Wu | |
| 2014/0071167 A1 | 3/2014 | Lauenstein et al. | |
| 2014/0249698 A1* | 9/2014 | Salmon | B63H 21/21 701/2 |
| 2014/0321242 A1 | 10/2014 | Acker et al. | |
| 2015/0085602 A1 | 3/2015 | Lebedev et al. | |
| 2015/0100658 A1 | 4/2015 | Lieberman et al. | |
| 2015/0312526 A1 | 10/2015 | Coleman et al. | |
| 2016/0007581 A1 | 1/2016 | Davidson | |

FOREIGN PATENT DOCUMENTS

| | | |
|---|---|---|
| JP | 2003344530 A | 12/2003 |
| KR | 2010-0993227 B1 | 11/2010 |
| KR | 100993227 B1 | 11/2010 |
| WO | WO 2005/073756 A1 | 8/2005 |
| WO | WO 2013/108088 A1 | 7/2013 |
| WO | WO 2013/186576 A1 | 12/2013 |

OTHER PUBLICATIONS

Deeper Smart Fish Finder for iOS and Android Devices, 11 pages, prior to May 12, 2014.
Geeky Gadgets, ReelSonar Fishfinder App and Smart Bobber Helps You Outsmart the Fish (video), 6 pages, prior to May 12, 2014.
Buy Cheap Portable Wireless Sonar Fishing Fish Finder Fishfinder, 4 pages, prior to May 12, 2014.
4 Levels Grauscale Wireless Fish Finder FF168W—Phiradar (China Manufacturer)—Products, 7 pages, prior to May 12, 2014.
International Search Report of the PCT Application No. PCT/CN2013/070667, dated Jan. 18, 2013, 9 pages.
European Search Report, European Application No. 13830402.7, dated Mar. 14, 2016, 7 pages.
European Search Report, European Application No. 15169760.4, dated Oct. 21, 2015, 8 pages.
Application and File History for U.S. Appl. No. 13/980,576, filed Jul. 19, 2013. Inventor: Xiujun Wu.
Application and File History for U.S. Appl. No. 14/291,247, filed May 30, 2014. Inventor: Tom Zenanko.
Application and File History for U.S. Appl. No. 29/572,114, filed Jul. 25, 2016. Inventor: Tom Zenanko.
EPO Third Party Observation for Application No. EP20130830402 issued Jan. 17, 2018, Inventor(s): Xiujun Wu.
International Preliminary Report on Patentability for corresponding International Application No. PCT/CN2013/070667 dated Feb. 24, 2015; 10 pages.

* cited by examiner

WIRELESS WATER REGIMEN DETECTING DEVICE, SYSTEM AND METHOD BASED ON WIFI

CROSS-REFERENCE TO RELATED APPLICATIONS

This application is a continuation of application Ser. No. 13/980,576, filed Jul. 19, 2013, which in turn claims priority to Application No. PCT/CN2013/070667, filed Jan. 18, 2013, each of which is hereby fully incorporated herein by reference.

TECHNICAL FIELD

The present invention relates to water regimen detecting devices, and more particularly to a wireless fish finder device, system and method based on WIFI generated at the fish finder module.

BACKGROUND

The existing devices for detecting the depth of water and fish (water regimen detecting device) mostly use wired means, which is not easy to be assembled and applied; although some of the existing water regimen detecting devices use wireless means, the existing water regimen detecting devices all use ASK modulation mode, thus, in practical application, it has some defects as follows: various wireless interference; data is simple; wrong transmission, wrong judgment and short distance of data transmission.

Additionally, in existing technology, the water regimen detecting device changes sonar information to be analog signal or switch signal for transmitting; it has defects that the transmission speed is slow, the data cannot be processed intelligently and it need to use the outdated display device as display terminal, but the newest intelligent display terminal such as smart phone cannot be used.

SUMMARY

An object of the present invention is to provide a wireless water regimen detecting device, system and method based on WIFI for overcoming the defects of the prior art.

To achieve above object, the present invention adopts the following technical solution:

the wireless water regimen detecting device includes a fish finder module, a data communication module connected to the fish finder module and a WIFI module connected to the data communication module.

In a preferred embodiment, the fish finder module includes a sonar sensor and a sonar detecting circuit connected to the sonar sensor; the communication connection between the fish finder module and the data communication module is serial communication.

In another preferred embodiment, the fish finder module further includes a speed sensor and a speed processing circuit connected to the speed sensor.

In another preferred embodiment, the fish finder module further includes a temperature sensor, a GPS module and a temperature processing circuit connected to the temperature sensor.

In another preferred embodiment, the fish finder module further includes a GPS module.

In another preferred embodiment, the data communication module includes a power circuit, a MCU processor connected to the power circuit and a memory connected to the MCU processor; the MCU processor is further connected to the WIFI module and fish finder module respectively.

The wireless water regimen detecting system based on WIFI includes an aforementioned wireless water regimen detecting device and an intelligent display terminal wirelessly connected to the wireless water regimen detecting device; the intelligent display terminal has a WIFI transceiver circuit wirelessly connected to the WIFI module of the wireless water regimen detecting device.

In a preferred embodiment, the intelligent display terminal may be a smart phone, a tablet computer, a personal computer, a notebook computer or a wireless receiver, each of which is provided with a display screen.

The water regimen detecting method based on WIFI includes the steps of: a fish finder module converts detected analog signal into digital signal and then converts it into sonar data package and makes once sending of the sonar package in one detecting period.

In a preferred embodiment, each sonar package includes detecting information of one detecting point; a data communication module of a wireless water regimen detecting device based on WIFI sets the number of points of each row of the detecting information of the sonar package and then sends it according to the display resolution of an intelligent display terminal.

In another preferred embodiment, the intelligent display terminal carries on a point-to-point wireless communication with the wireless water regimen detecting device by WIFI wireless communication, the sonar data package of the wireless water regimen detecting device is sent to the intelligent display terminal, the display screen of the intelligent display terminal displays in a row by row way, the intelligent display terminal is a dedicated wireless receiver or a smart phone, tablet PC, notebook computer loading an application program; or, the intelligent display terminal make a wireless communication connection with the wireless water regimen detecting device by WIFI, directly inputs the IP address of the wireless water regimen detecting device in its browser, visits the web server of the wireless water regimen detecting device; the web server is in a Sweb operating mode of monopoly serial communication port; when the intelligent display terminal visits the webpage of the wireless water regimen detecting device, the wireless water regimen detecting device detects the display resolution of the intelligent display terminal, makes the sonar data package produce relevant webpage data format according to the display resolution and then store it in the space of the web server for visit and read by the intelligent display terminal.

Compared with the prior art, the present invention has the following beneficial effects: the present invention utilizes the wireless communication way of WIFI to make the display terminal of the fish finder module not be limited to the wireless receiving terminal which is especially prepared for it, but can use exciting intelligent terminals with a WIFI wireless communication function to display, such as smart phone, tablet PC, notebook computer or other portable mobile devices. The present invention further utilizes the Sweb operating mode of monopoly serial communication port to make the user can carry on related operation on the webpage of the display terminal by visiting the web server to obtain detecting information of the fish finder module. The present invention provides much convenience to user. Because of adopting the data processing means of making the data to be data package firstly and then sending it, the data safety and transmission speed of the wireless water regimen detecting production can be improved, and the wireless water regimen detecting production of the present invention can be used with all kinds of smart phones on sale.

Now the present invention will further be described as follows by combining accompanying drawings and specific embodiments.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

DESCRIPTION OF THE LABELS IN THE FIGURES

| A | wireless water regimen detecting device; | B | intelligent display terminal; |
|---|---|---|---|
| 10 | fish finder module; | 11 | sonar sensor; |
| 12 | sonar detecting circuit; | 13 | speed sensor; |
| 14 | speed processing circuit; | 15 | temperature sensor; |
| 16 | temperature processing circuit; | 17 | GPS module; |
| 20 | data communication module; | 21 | power circuit; |
| 22 | MCU processor; | 23 | memory; |
| 30 | WIFI module; | 40 | WIFI transceiving circuit; |
| 50 | housing. | | |

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

For understanding the technical content of the present invention more sufficiently, now combine specific embodiments to introduce and illustrate the technical solution of the present invention as follows, but it is not limited to this.

Figure 1:
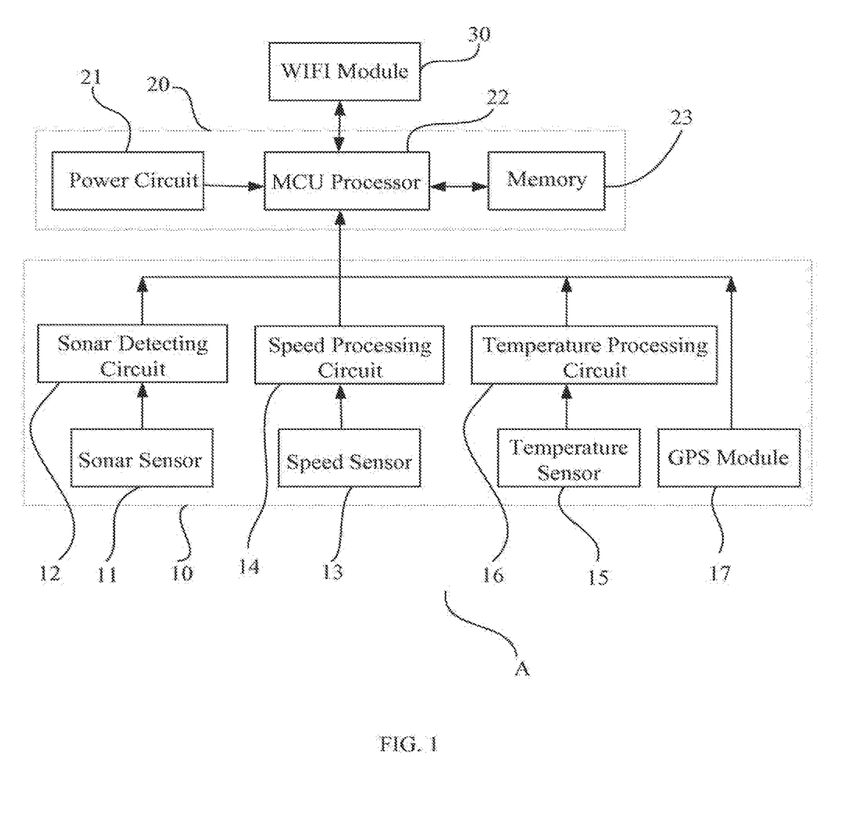
FIG. 1 is a structure block diagram of a wireless water regimen detecting device based on WIFI according to a specific embodiment of the present invention.
Figure 2:
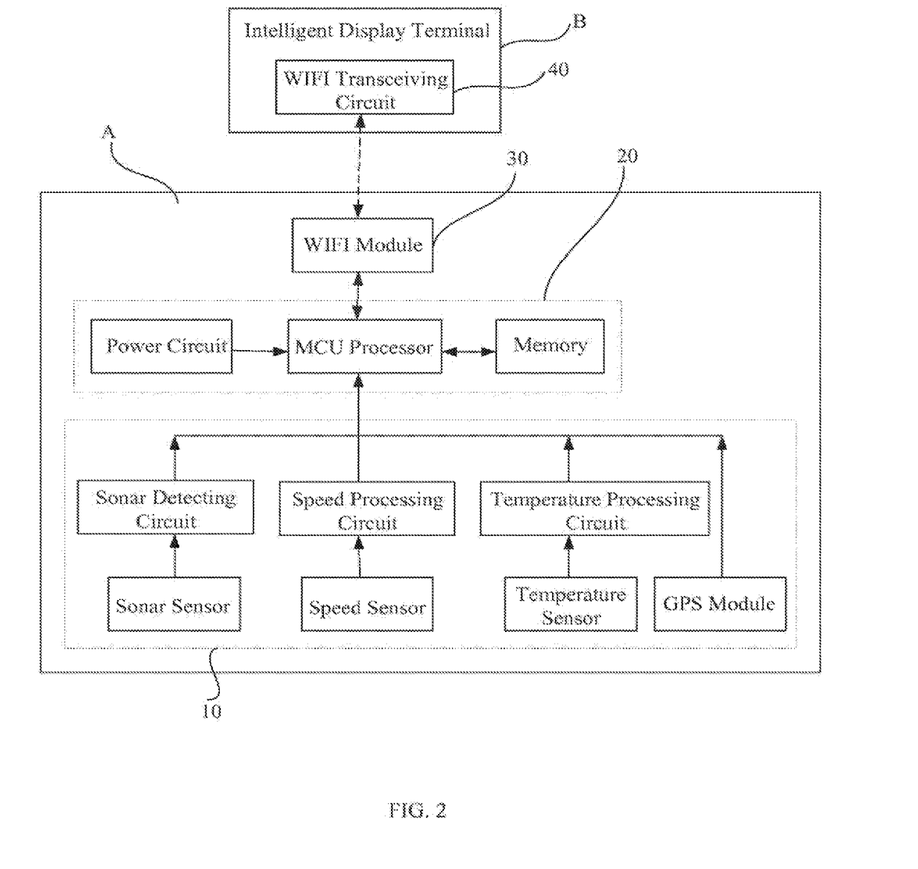
FIG. 2 is a structure block diagram of a wireless water regimen detecting system based on WIFI according to a specific embodiment of the present invention.
Figure 3:
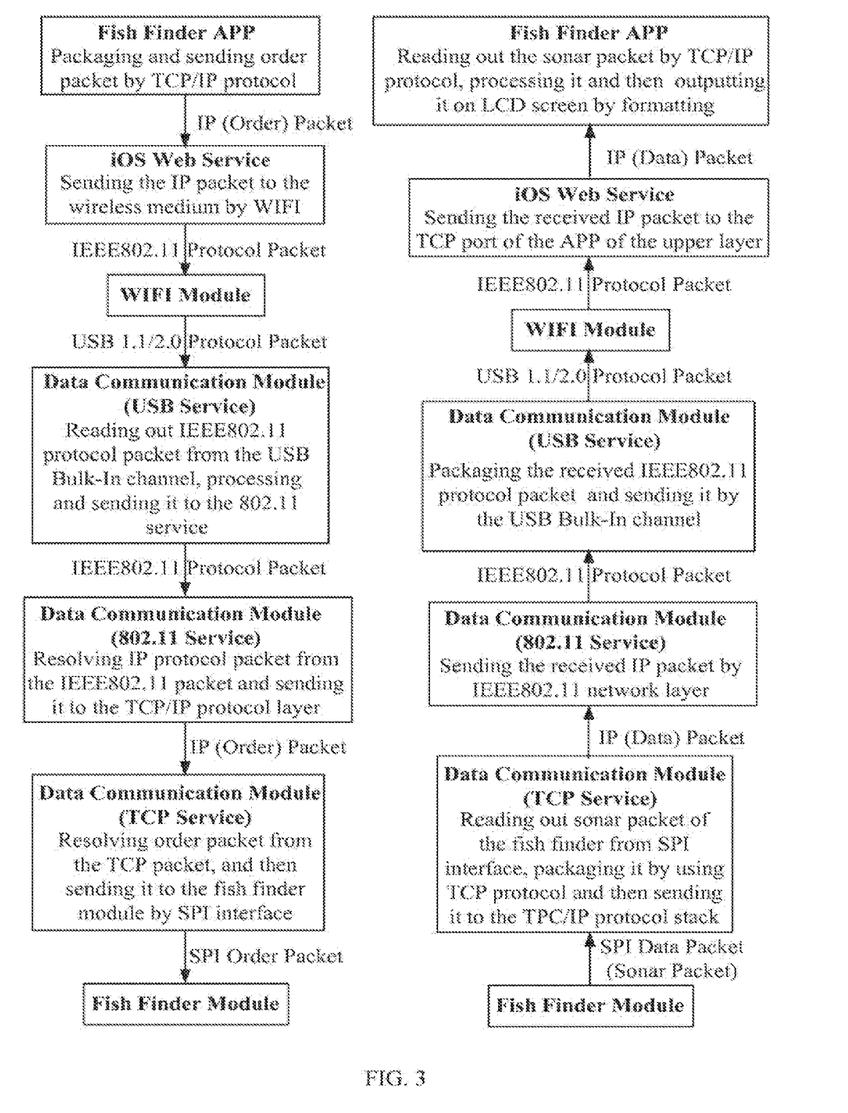
FIG. 3 is a schematic diagram illustrating a transmitting process of the sonar data package and instruction package of WIFI fish finder of the wireless water regimen detecting system based on WIFI according to a specific embodiment of the present invention that uses an Iphone as display terminal.

As shown in FIG. 1 to FIG. 3, the wireless water regimen detecting device based on WIFI A of the present invention includes a fish finder module 10, a data communication module 20 connected to the fish finder module 10 and a WIFI module 30 connected to the data communication module 20. The fish finder module 10 includes a sonar sensor 11 and a sonar detecting circuit 12 connected to the sonar sensor 11; the communication connection between the fish finder module 10 and the data communication module 20 is serial communication. The fish finder module 10 further includes a speed sensor 13 and a speed processing circuit 14 connected to the speed sensor 13. The fish finder module 10 further includes a temperature sensor 15 and a temperature processing circuit 16 connected to the temperature sensor 15. The fish finder module 10 further includes a GPS module 17. The data communication module 20 includes a power circuit 21, a MCU processor 22 connected to the power circuit 21 and a memory 23 connected to the MCU processor 22; the MCU processor 22 is further connected to the WIFI module 30 and fish finder module 10.

Wherein, each above-mentioned component will be illustrated as follows:

1. The sonar detecting circuit produces sonar detecting wave, which will be sent by the sonar sensor (transducer), after the sonar sensor receiving real-time reflected wave, it will be magnified and shaped by the sonar detecting circuit, after digital-to-analog conversion in the MCU processor, it will be converted into the number of columns of the points corresponding to the display size of the monitoring end and then sent to the monitoring end (display terminal) via WIFI;

2. The sending frequency and sending speed of the sonar detecting wave are set by the MCU processor according to the need when using;

3. The speed processing circuit and sensor can be composed of Hall switch, the data from the speed processing circuit and sensor will be sent to the MCU processor to calculate the movement speed of the fish finder module, and then sent to the monitoring end via WIFI;

4. The temperature processing circuit and sensor can be composed of thermistor, according to the AD value of thermal effect of the thermistor, the MCU processor calculates out the temperature value, which will be sent to the monitoring end via WIFI;

5. The GPS module is provided for locating longitude and latitude, which is calculated by the MCU processor and then sent to the monitoring end via WIFI;

6. The memory unit is provided for supplying sufficient space for software writing and program run;

7. The power control circuit is provided for supplying power to each function unit.

The wireless water regimen detecting system based on WIFI of the present invention includes the aforementioned wireless water regimen detecting device A and an intelligent display terminal B connected to the wireless water regimen detecting device A. The intelligent display terminal has a WIFI transceiver circuit 40 wirelessly connected to the WIFI module of the wireless water regimen detecting device. Wherein, the intelligent display terminal is a smart phone with display screen, a tablet PC, a personal computer, a notebook computer or a wireless receiver.

The detailed description will be shown as follows:

1. At the sonar detecting end of the production: its data is processed by the MCU and then sent to the display monitoring end (display terminal) of the production via WIFI;

2. At the sonar detecting end of the production: its data, according to the control of the display monitoring end of the production, is adjusted automatically to adapt the function of the monitoring display;

3. At the sonar detecting end of the production: it is a provisional self-help network protocol; any intelligent terminal with a WIFI visiting function can visit the detecting end after installing a display monitoring end software (TM);

4. The display monitoring end, which has installed a display monitoring software, runs the software and then can automatically search the sonar detecting end of the production and choose the relevant data of the sonar detecting end;

5. The display monitoring end can search multiple sonar detecting ends simultaneously, and also can preview the data of multiple monitoring ends simultaneously;

6. The data of the sonar detecting end of the production includes the following information: the deepness of water bottom, the real-time signal of underwater characteristic status, fish or barrier, outline of water bottom, temperature, speed, voltage of device, longitude and latitude and so on;

7. The sonar detecting end of the production: the detecting software (TM), according to the control of the monitoring end, can adapt the frequency application of various standard transducers;

8. The sonar detecting end of the production: the detecting software (TM) has a data compression function, thereby improving the wireless transmitting and receiving function.

Figure 4:
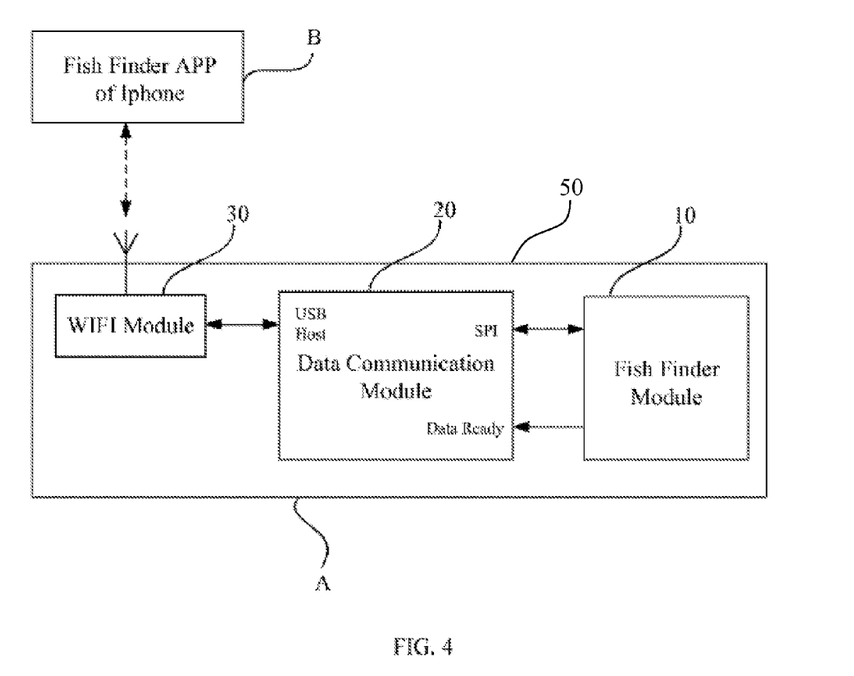
FIG. 4 is a structure block diagram of an embodiment shown in FIG. 3.

FIG. 3 is a schematic diagram illustrating a transmitting process of the sonar data package and instruction package of WIFI fish finder of the wireless water regimen detecting system based on WIFI according to a specific embodiment of the present invention that uses an Iphone as display terminal FIG. 4 is a structure block diagram of the wireless water regimen detecting system based on WIFI of the present invention using building block design, it is composed of the following four modules and a housing 50:

Fish Finder Module:

1) Via SPI interface, receiving the instruction of "data communication module" and responding to the data;

2) Via "data ready" signal line, the "fish finder module" informs the "data communication module" that the data is ready, and then waits for the "data communication module" to read;

Data Communication Module:

1) Using USB host protocol to build a data communication with the WIFI module of the USB Interface;

2) Using standard SPI interface and the "data ready" signal line to build a data communication with the "fish finder module";

WIFI Module:

1) Building a data communication with the "data communication module" via USB interface;

2) Building a wireless communication with an Iphone via 2.4G WIFI wireless interface;

Fish Finder APP of the Iphone:

1) Building a communication with the WIFI fish finder via IOS TCP/IP protocol;

2) Sending the instruction package configuration and controlling the "fish finder";

3) Reading the sonar data package of the "fish finder", processing and formatting it and then displaying on the LCD screen.

The wireless water regimen detecting method based on WIFI includes the steps of: the fish finder module converts detected analog signal into digital signal and then converts it into sonar data package and makes once sending of the sonar package in one detecting period. Each sonar package includes detecting information of one detecting point; a data communication module of a wireless water regimen detecting device based on WIFI sets the number of points of each row of the detecting information of the sonar package and then sends it according to the display resolution of an intelligent display terminal.

One way is: the intelligent display terminal is a dedicated wireless receiver or a smart phone, tablet computer, notebook computer, each of which is loaded an application program; via a specific user interface, the intelligent display terminal makes a point-to-point wireless communication with the wireless water regimen detecting device by WIFI wireless communication; the sonar data package of the wireless water regimen detecting device is sent to the intelligent display terminal and the display screen of the intelligent display terminal displays it row by row; for the display screen, the number of displayed columns depends on the width of resolution of the display screen, and the number of each column depends on the height of resolution of the display screen. Such a way has advantages of low cost and fast speed of data transmission, but it needs to install a specific program or use a wireless receiver which is especially prepared.

Another way is: the intelligent display terminal makes a wireless communication connection with the wireless water regimen detecting device by WIFI, directly inputs the IP address of the wireless water regimen detecting device in its browser and visits the web server of the wireless water regimen detecting device; the web server is in a Sweb operating mode of monopoly serial communication port; when the intelligent display terminal visits the webpage of the wireless water regimen detecting device, the wireless water regimen detecting device detects the display resolution of the intelligent display terminal, makes the sonar data package produce relevant webpage data format according to the display resolution and then stores it in the space of the web server for the intelligent display terminal to visit and read. Wherein, the web server is in a Sweb operating mode of monopoly serial communication port; the wireless connection between the intelligent display terminal and wireless water regimen detecting device is point-to-point ADHOC mode; the data interaction between the serial port communication and web server in Sweb operating mode is in js script programming way, use the method of AJAX+POST, control the data transmitting and receiving in the browser background and display in the browser foreground. Concretely, it will be described as follows: the DHCP function under the ADHOC mode (point-to-point): ADHOC mode (point-to-point) is a very simple networking mode and dispenses with wireless router, multiple nodes can build network and communicate with each other expediently. Such networking mode determines the dynamics of the network the node can be added or dropped out at any time. After being added, it can exchange data with other nodes, and it will disappear if it is dropped out. Each ADHOC node has equal position, and no one can assign an address to others like an AP (Network Bridge). Thus, when use the ADHOC network, the user needs to give the module a static IP address. The characteristic of this way is that the intelligent display terminal only needs to make its browser build a communication with WIFI without loading a specific program.

The detail of DHCP dynamic IP address allocation function will be described as follows:

The module needs to use ADHOC network and DHCP simultaneously to obtain two IP setting.

The ADHOC network is built by the first power-on module, when the node used for building network finds that only the one itself is in the same network, it will use the IP address set under default and static status as its IP, and guide one DHCP server to assign IP to the nodes of the later module or the notebook, smart phone connected to the same ADHOC network. This way does not require the user to set the IP address, thereby ensuring good experience of use.

The summarize of Sweb: in our design idea, the web server is a important part, its homepage, status page and configuration page have sufficiently shown its effect and function.

The supply of user storage space makes the applications of customizing page, writing JS script logic, placing Flash and deploying JavaApplet be possible, and the Sweb mode realizes to visit the serial port in page logic.

The principle of this Web interface application is that: the server-side (module) provides interface frame (html†css†img) and logic (js) all at once, and provides dynamic data (in ajax way) more than once; the user needs to connects the hardware to the serial port of the device, prepares the static data (designing webpage and page logic JS) and programs the format of the dynamic data (the device end programming the command protocol).

Sweb mode is an operating mode of the monopoly serial port of the webpage server. In the browser, the files of user can be visited via the path of "/sweb/". No matter it is Sweb mode or not, the user can visit the files under the directory of "/sweb/". Under the Sweb mode, the visiting of the browser to the device IP will be redirected to the file of "/sweb/index.htm". Under the Sweb mode, the browser visits the serial port by "/sweb.cgi".

For instance, when visiting "http://192.168.1.254/sweb.cgi", the page will return serial cache data; supporting three kinds of parameters: "file" indicates requested file, "wait" indicates setting the waiting time of serial port, "clean" indicates emptying the serial port for receiving cache; ".GET default" is used for asking for file data, if the parameter "wait" does not be set, it will be replaced by the default value "HoldTime" of the parameter configuration; POST is generally used for sending data, no setting the parameter "wait" indicates no reading the serial port, if setting "wait=0", it indicates no waiting, that means reading cache directly after sending; the parameter "clean" is used for emptying the serial port for receiving cache, the affect of the messy data can be cleared up by setting the parameter "clean", so as to suitable for the working mode of "command, reply"; its detailed process includes: emptying cache, sending prompt, waiting for receiving, reading cache and returning to page. The parameter "wait" is used for setting the waiting time for the serial port, and its unit is ms.

Web Visit of the Sweb Mode:

WifimodII provides storage space for storing the user page file, except reading data from the locality, wifimodII also supports to obtain file from the serial port.

Visiting Homepage:

Under the Sweb mode of wifimodII, visiting the default homepage (http://IP) will be redirected to the user space "/sweb/index.htm".

The user can modify this page to realize a user-defined user interface. The default homepage is the page of the device itself, it is equated to "http://192.168.1.254/index.htm".

Visiting the Files in User Space:

The files in user space (directory of "/sweb") can be visited by the way such as "http://192.168.1.254/sweb/abc.xyz".

Requesting Page by Serial Port:

The client requests files from the serial port, its chaining is:

http://192.168.1.254/sweb.cgi?file=usr.btm&clean=1&wait=2000

"file=usr.htm" indicates that the requested file name is "usr.htm" (may include path).

"clean=1" indicates that emptying for receiving cache before the serial obtains feedback;

"wait=2000" indicates that the longest idle waiting time of the serial port is 2000 ms after the prompt message is outputted;

Entering above address into the address bar of the browser, wifimodII will empty the serial port for receiving cache and the character string "swebgetusr.htm\r\n" ("\r\n" is a carriage return) will be outputted from the serial port. After that, the data received by the serial port will be returned to the browser until can not receive the data in 2000 ms.

Interacting Data with the Serial Port:

The data interaction with the serial port under Sweb operating mode is in js script programming way, use the method of "AJAX+POST", control the data transmitting and receiving in the browser background and display it in the browser foreground. This way of data interaction will not suffer the affect of the browser cache mechanism.

In conclusion, the present invention utilizes the wireless communication way of WIFI to make the display terminal of the fish finder module not be limited to the wireless receiving terminal which is especially prepared for it, but can use exciting intelligent terminals with a WIFI wireless communication function to display, such as smart phone, tablet PC, notebook computer or other portable mobile devices. The present invention further utilizes the Sweb operating mode of monopoly serial communication port to make the user can carry on related operation on the webpage of the display terminal by visiting the web server to obtain detecting information of the fish finder module. The present invention provides much convenience to user. Because of adopting the data processing means of making the data to be data package firstly and then sending it, the data safety and transmission speed of the wireless water regimen detecting production can be improved, and the wireless water regimen detecting production of the present invention can be used with all kinds of smart phones on sale.

Above descriptions are provided for further illustrating the technical content of the present invention by embodiments, so as to make the reader understand easily. But it not represent that the mode of execution is just limited to be this, any technique extension and recreation according to the present invention is protected by the present invention.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A wireless fish finder device configured to be deployed on water and to communicate with a remote terminal using WIFI, the wireless fish finder device comprising:
   a housing configured to be deployed on water;
   a fish finder module arranged at the housing, wherein the fish finder module comprises a sonar detecting assembly for detecting a real-time signal of underwater characteristics including the depth of water and an outline of a floor of water, and a GPS module for locating a longitude and a latitude;
   a data communication module arranged in the housing and mechanically connected to the fish finder module; and
   a WIFI module arranged in the housing, mechanically connected to the data communication module, and configured to generate a WIFI hotspot to communicate between the housing and the remote terminal.

2. The wireless fish finder device according to claim 1, wherein the sonar detecting assembly comprises a sonar detecting circuit connected to a sonar sensor.

3. The wireless fish finder device according to claim 2, wherein the longitude and the latitude is calculated by a microcontroller.

4. A wireless fish finder system using WIFI, comprising a wireless fish finder device as claimed in claim 3, and a remote terminal wirelessly connected to the wireless fish device, wherein the remote terminal has a WIFI transceiver circuit wirelessly connected to the WIFI module of the wireless fish finder device.

5. The wireless fish finder system using WIFI according to claim 4, wherein the intelligent display terminal comprises at least one of a smart phone, a tablet computer, a personal computer, a notebook computer or a wireless receiver, each of which is provided with a display screen.

6. A wireless fish finder system using WIFI, comprising a wireless fish finder device as claimed in claim 2, and a remote terminal wirelessly connected to the wireless fish finder device, wherein the remote terminal has a WIFI transceiver circuit wirelessly connected to the WIFI module of the wireless fish finder device.

7. The wireless fish finder system using WIFI according to claim 6, wherein the remote terminal comprises at least one of a smart phone, a tablet computer, a personal computer, a notebook computer or a wireless receiver, each of which is provided with a display screen.

8. The wireless fish finder device according to claim 2, wherein the sonar sensor comprises a transducer defining a detecting point.

9. The wireless fish finder device according to claim 1, further comprising a serial communication connection between the fish finder module and the data communication.

10. A wireless fish finder system using WIFI, comprising a wireless fish finder device as claimed in claim 9, and a remote terminal wirelessly connected to the wireless fish finder device, wherein the remote terminal has a WIFI transceiver circuit wirelessly connected to the WIFI module of the wireless fish finder device.

11. The wireless fish finder system using WIFI according to claim 10, wherein the remote terminal comprises at least one of a smart phone, a tablet computer, a personal computer, a notebook computer or a wireless receiver, each of which is provided with a display screen.

12. The wireless fish finder device according to claim 1, wherein the fish finder module further comprises a speed sensor and a speed processing circuit connected to the speed sensor.

13. A wireless fish finder system using WIFI, comprising a wireless fish device as claimed in claim 12, and a remote terminal wirelessly connected to the wireless fish finder device, wherein the remote terminal has a WIFI transceiver circuit wirelessly connected to the WIFI module of the wireless fish finder device.

14. The wireless fish finder system using WIFI according to claim 13, wherein the remote terminal comprises at least one of a smart phone, a tablet computer, a personal computer, a notebook computer or a wireless receiver, each of which is provided with a display screen.

15. The wireless fish finder device according to claim 1, wherein the data communication module comprises a power circuit, a MCU processor connected to the power circuit and a memory connected to the MCU processor, and wherein the MCU processor is further connected to the WIFI module and fish finder module respectively.

16. The wireless fish finder device according to claim 1, wherein the fish finder module further comprises a temperature sensor and a temperature processing circuit mechanically connected to the temperature sensor.

17. A wireless fish finder system using WIFI, comprising a wireless fish finder device as claimed in claim 1, and a remote terminal wirelessly connected to the wireless fish finder device, wherein the remote terminal has a WIFI transceiver circuit wirelessly connected to the WIFI module of the wireless fish finder device.

18. The wireless fish finder system using WIFI according to claim 17, wherein the remote terminal comprises at least one of a smart phone, a tablet computer, a personal computer, a notebook computer or a wireless receiver, each of which is provided with a display screen.

19. The wireless fish finder device of claim 1, wherein the WIFI hotspot is configured to be accessible to at least one portable mobile device as the remote terminal.

20. The wireless fish finder device of claim 19, wherein the at least one portable mobile device has an intelligent display terminal having a display screen and a downloadable application for user control of a sonar data package from the wireless fish finder device.

21. A water-based detecting method using WIFI, the method comprising:
converting an analog signal detected by a sonar sensor of a fish finder module arranged in a housing deployed on water into a digital signal using a sonar detecting circuit arranged in the housing;
locating a longitude and a latitude by a GPS module arranged in the housing;
converting the digital signal into a sonar data package with the sonar detecting circuit; and
generating a WIFI hotspot at the housing to transmit the sonar data package and the longitude and the latitude from the fish finder module in the housing to a remote terminal.

22. The water-based detecting method using WIFI according to claim 21, wherein the housing defines a wireless fish finder device, wherein each sonar package comprises detecting information corresponding to a detecting point, wherein a data communication module arranged in the housing of the wireless fish finder device sets a number of points of each row of the detecting information of the sonar package and then sends the sonar package according to the display resolution of the remote terminal.

23. The water-based detecting method using WIFI according to claim 22, wherein the remote terminal carries out a point-to-point wireless communication with the wireless fish finder device by WIFI wireless communication, the sonar data package of the wireless fish finder device is sent to the remote terminal, the display screen of the remote terminal displays row by row, the remote terminal is a dedicated wireless receiver or a smart phone, tablet computer, notebook computer loading an application program; or, the remote terminal makes a wireless communication connection with the wireless fish finder device by WIFI, directly inputs an IP address of the wireless fish finder device in a browser, visits a web server of the wireless fish finder device, wherein the web server is in a Sweb operating mode of monopoly serial communication port, wherein when the remote terminal visits the webpage of the wireless fish finder device, the wireless fish finder device detects a display resolution of the remote terminal, makes the sonar data package produce a relevant webpage data format according to the display resolution and then stores the produced data format in the space of the web server for visit and read by the remote terminal.

24. A wireless fish finder device configured to be deployed on water and to communicate with a remote terminal using WIFI, the wireless fish finder device comprising:
a housing configured to be deployed on water;
a fish finder module arranged in the housing and comprising a sonar sensor, a sonar detecting circuit mechanically connected to the sonar sensor, and a GPS module for locating a longitude and a latitude;
a data communication module arranged in the housing and connected to the fish finder module; and
a WIFI module arranged in the housing, connected to the data communication module and configured to generate a WIFI hotspot to communicate between the housing and the remote terminal;
wherein the wireless fish finder device is capable of being wirelessly connected to the remote terminal by a WIFI transceiver circuit wirelessly connected to the WIFI module of the wireless fish finder device, the remote terminal having a display screen and a downloadable application for user control of a sonar data package with the longitude and the latitude from the wireless fish finder device.

25. The wireless fish finder device according to claim 24, wherein the remote terminal comprises at least one of a smart phone, a tablet computer, a personal computer, a notebook computer or a wireless receiver.

26. A wireless fish finder device configured to communicate with a remote terminal using WIFI, the wireless fish finder device comprising:
a fish finder module comprising a sonar detecting assembly and a GPS module, the sonar detecting assembly capable of producing a sonar detecting wave and receiving a real-time reflected wave, the real-time reflected wave providing data concerning a real-time signal of underwater characteristic stats, a deepness of a water bottom, an outline of a floor of the water bottom, a fish, a barrier, or a combination thereof, and the GPS module capable of providing a longitude and a latitude of the data from the real-time reflected wave;
a data communication module arranged in a housing and configured to provide a data communication with the fish finder module, wherein the data communication module is configured to process the data from the real-time reflected waver and the longitude and the latitude of the data from the real-time reflected wave to provide processed data; and
a WIFI module connected to the data communication module, wherein the WIFI module is configured to generate a WIFI hotspot to communicate the processed data between the data communication module and the remote terminal.

* * * * *